(12) United States Patent
Nakayama

(10) Patent No.: US 6,618,497 B1
(45) Date of Patent: Sep. 9, 2003

(54) PHOTOGRAMMETRIC IMAGE PROCESSING APPARATUS AND METHOD

(75) Inventor: Toshihiro Nakayama, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/598,980

(22) Filed: Jun. 21, 2000

(30) Foreign Application Priority Data

Jun. 24, 1999 (JP) .......................................... 11-178718

(51) Int. Cl.$^7$ ................................................ G06K 9/00
(52) U.S. Cl. ...................................................... 382/154
(58) Field of Search ................................ 382/103, 113, 382/106, 154, 254; 348/95, 113, 116, 118, 121, 135, 139, 144, 552, 580; 345/178, 419, 424, 427; 356/3, 601, 614, 625, 628; 396/7, 50, 89, 322, 427; 701/200, 208, 216, 217; 702/2, 5, 152, 153, 158, 159

(56) References Cited

U.S. PATENT DOCUMENTS

| | | | | |
|---|---|---|---|---|
| 3,621,326 A | * | 11/1971 | Hobrough | 315/9 |
| 4,101,891 A | * | 7/1978 | Jain et al. | 342/25 |
| 4,148,580 A | * | 4/1979 | Hill, Sr. | 355/52 |
| 4,463,380 A | * | 7/1984 | Hooks, Jr. | 348/580 |
| 5,073,819 A | * | 12/1991 | Gates et al. | 348/140 |
| 5,187,754 A | * | 2/1993 | Currin et al. | 382/284 |
| 5,517,419 A | * | 5/1996 | Lanckton et al. | 701/216 |
| 5,699,444 A | | 12/1997 | Palm | |
| 5,995,765 A | * | 11/1999 | Kaneko et al. | 396/89 |
| 6,144,761 A | * | 11/2000 | Kaneko et al. | 382/154 |
| 6,304,669 B1 | * | 10/2001 | Kaneko et al. | 382/154 |

FOREIGN PATENT DOCUMENTS

| | | |
|---|---|---|
| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10293026 | 11/1998 |
| JP | 10307025 | 11/1998 |
| JP | 11295065 | 10/1999 |

OTHER PUBLICATIONS

English Language Translation of JP 10–307025.
English Language Translation of JP 10–221072.
English Language Translation of JP 10–185563.
English Language Translation of JP 10–185562.
English Language Translation of JP 10–170263.
English Language Translation of JP 10–141951.
English Language Translation of JP 11–295065.

* cited by examiner

*Primary Examiner*—Jose L. Couso
(74) *Attorney, Agent, or Firm*—Greenblum & Bernstein, P.L.C.

(57) ABSTRACT

A photogrammetric image processing apparatus and method defining a plurality of pairs of images including a common target as belonging to the same groups (pairs), providing an image display area and drawing area on the screen of the display device, calculating valid mapping ranges for the pairs 1 to 4, and displaying the valid mapping ranges on the drawing area. When an arbitrary point is designated using a cursor in the drawing area, paired images corresponding to one of the valid mapping ranges containing the designated point are displayed in the image display area. Physical points corresponding to the paired images are designated, so that the three-dimensional coordinates of physical points are calculated, and a survey map is generated based on the three-dimensional coordinates.

14 Claims, 14 Drawing Sheets

FIG. 14

SUITABLE PAIR STACK

| | INDEX | SUITABLE PAIR NUMBER(j) |
|---|---|---|
| TOTAL NUMBER OF SUITABLE PAIRS N=3 | 0 | 1 |
| | 1 | 3 |
| | 2 | 4 |

FIG. 15

IN CASE OF N=3

| TR | num | DISPLAYED PAIR |
|---|---|---|
| 0 | 0 | PAIR 1 |
| 1 | 1 | PAIR 3 |
| 2 | 2 | PAIR 4 |
| 3 | 0 | PAIR 1 |
| 4 | 1 | PAIR 3 |
| 5 | 2 | PAIR 4 |
| 6 | 0 | PAIR 1 |
| ⋮ | ⋮ | ⋮ |

PHOTOGRAMMETRIC IMAGE PROCESSING APPARATUS AND METHOD

BACKGROUND OF THE INVENTION

1. Field of the Invention

The present invention relates to image processing in photogrammetry.

2. Description of the Related Art

Photogrammetry is being widely used in making maps and is also being used as an extremely effective tool in recording local conditions at examinations of the scenes of traffic accidents for example. Conventionally, in photogrammetry, a stereo camera system consisting of two cameras, fixed at a distance away from each other, is used so as to calculate the three-dimensional coordinates of surveyed points from the two images captured by the two cameras. The stereo camera system is a large, heavy piece of equipment. Further, the calculation of the three-dimensional coordinates requires recording of detailed information such as the positional information and angle of inclination of the camera and the measured length of a target object etc. The surveying work is both complicated and hard in terms of labor. Further, a sufficiently clear photographic environment often can not be secured, such as when there are obstacles in the area surrounding the scene of a traffic accident. Often examination of the scene by stereo camera systems is difficult.

Therefore, the assignee has proposed a large number of photogrammetric methods using single lens cameras (Japanese Unexamined Patent Publication (Kokai) No. 10-293026 and Japanese Unexamined Patent Publication (Kokai) No. 10-221072) and targets to be included in pairs of images (hereinafter referred to as "paired images") for improving the precision of photogrammetry (Japanese Unexamined Patent Publication (Kokai) No. 10-307025, Japanese Unexamined Patent Publication (Kokai) No. 10-293026, Japanese Unexamined Patent Publication (Kokai) No. 10-185563, Japanese Unexamined Patent Publication (Kokai) No. 10-185562, Japanese Unexamined Patent Publication (Kokai) No. 10-170263, and Japanese Unexamined Patent Publication (Kokai) No. 10-141951) for realizing efficient photogrammetry with simple equipment.

Such a photogrammetric method obtains paired images taken of the same target and survey object from different directions and uses a mouse or other input means in a specialized photogrammetric image processing apparatus to manually designate surveyed points commonly included in the paired images (hereinafter referred to as "physical points") and thereby survey any range based on these points.

Since a large number of paired images are used when the survey extends over a broad range, the manual finding and designating of the corresponding physical points in each of the paired images becomes complex, of course. Further, considering the need for survey precision, selection of the physical points to obtain sufficient precision is extremely complicated even for a skilled operator.

The survey maps obtained from the large number of paired images are connected together. At the time of making the map, it is difficult to identify which positions of the surveyed range the obtained survey maps show and therefore it is necessary to designate a large number of physical points. Therefore, the work efficiency drops significantly.

SUMMARY OF THE INVENTION

An object of the present invention is to provide a photogrammetric image processing apparatus, a photogrammetric image processing method and a storage medium, in which a photogrammetric image processing program is stored, by which a large improvement in efficiency of the manual work in photogrammetric image processing is achieved.

According to a first aspect of the present invention, there is provided a photogrammetric image processing apparatus defining a plurality of images commonly including a target at a predetermined position as being in the same group, calculating the camera position of the photographing camera taking each image and the inclination of its optical axis for each image, designating a common physical point in each image, calculating three-dimensional coordinates of the physical point, and generating a survey map based on the three-dimensional coordinates, comprising a display processor that has a image display area for displaying all of the images belonging to the same group, and a drawing area for displaying that survey map, an area computing processor that calculates a valid mapping range of the same group, which is shown in that drawing area, based on the camera position and the optical axis inclination, and a control processor that displays images of a predetermined group in that image display area, and displays that valid mapping range of that predetermined group in that drawing area.

According to a second aspect of the present invention, there is provided a photogrammetric image processing method defining a plurality of images commonly including a target of a predetermined shape provided at a predetermined position and enabling output of an amount of displacement and rotational angle from an initial state as belonging to the same group, calculating the camera position of the photographing camera taking each image and the inclination of its optical axis for each image, displaying that image in an image display area of a display processor and designating a common physical point in that image contained in that image display area, calculating three-dimensional coordinates of that physical point, generating a survey map based on the three-dimensional coordinates, and displaying that survey map in a drawing area of that display processor, comprising a first step of calculating a range of guaranteed precision corresponding to each image based on the camera position and the optical axis inclination of each image included in the same group, a second step of calculating an overlapping area of the ranges of guaranteed precision of that image of the same group to obtain a valid mapping range of the same group, and a third step of displaying images of a predetermined group in that image display area, and displaying that valid mapping range of that predetermined group in that drawing area.

According to a third aspect of the present invention, there is provided a storage medium storing a photogrammetric image processing program defining a plurality of images commonly including a target of a predetermined shape provided at a predetermined position and enabling output of an amount of displacement and rotational angle from an initial state as belonging to the same group, calculating the camera position of the photographing camera taking each image and the inclination of its optical axis for each image, displaying that image in an image display area of a display processor and designating a common physical point in that image contained in that image display area, calculating three-dimensional coordinates of that physical point, generating a survey map based on the three-dimensional coordinates, and displaying that survey map in a drawing area of that display processor, that photogrammetric image processing program including a routine for calculating a range of guaranteed precision corresponding to each image based on the camera position and the optical axis inclination of each image included in the same group, a routine for calculating an overlapping area of the ranges of guaranteed precision of that image of the same group to obtain a valid mapping range of the same group, and a routine for displaying images of a predetermined group in that image display area, and displaying that valid mapping range of that predetermined group in that drawing area.

BRIEF DESCRIPTION OF THE DRAWINGS

The present invention will be better understood from the description of the preferred embodiments of the invention set forth below together with the accompanying drawings, in which:

FIG. 14 is a view showing a relationship between an index in a suitable pair stack and a suitable pair number;

FIG. 15 is a view showing a relationship among a trigger action number TR, a variable num and a displayed pair.

DESCRIPTION OF THE PREFERRED EMBODIMENTS

Figure 1:
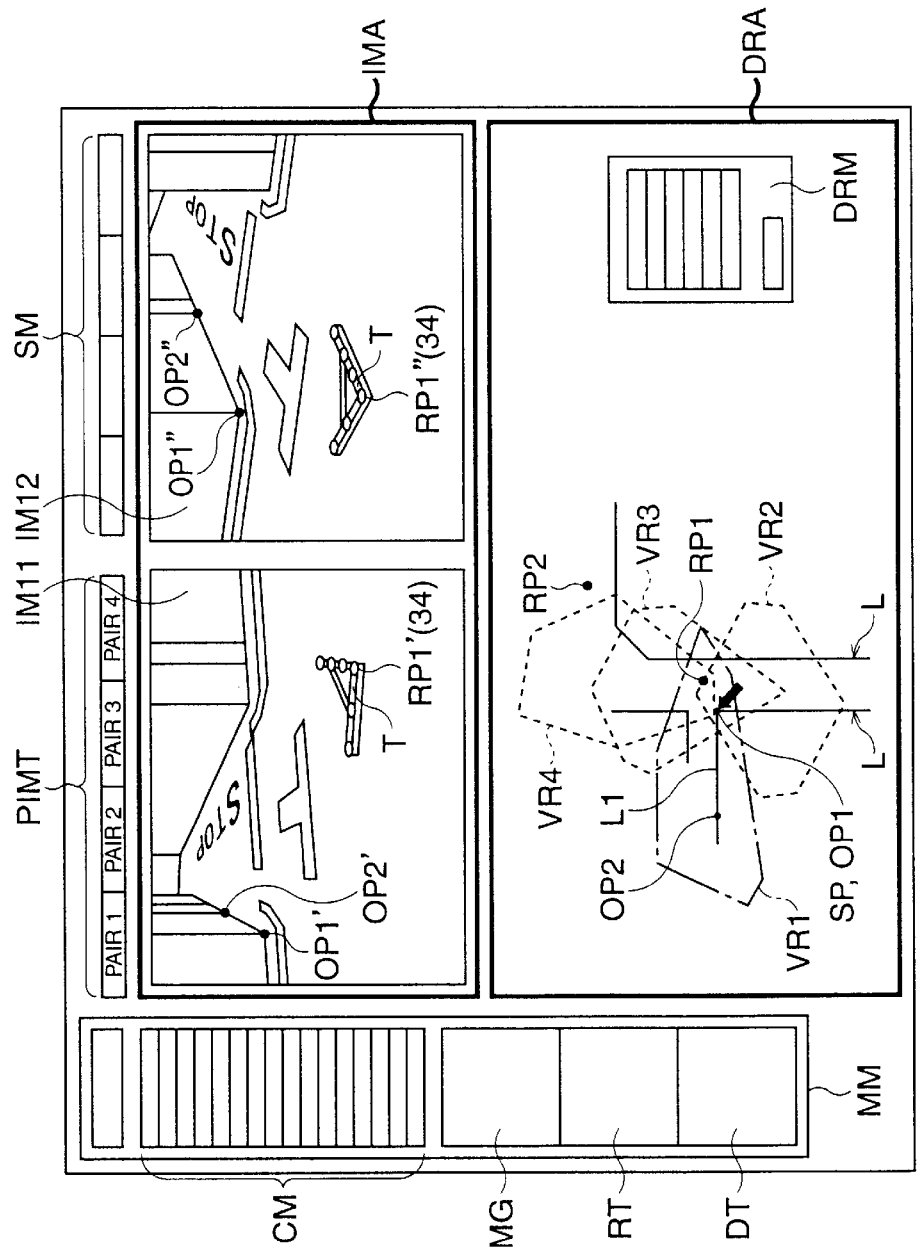
FIG. 1 is a schematic view of a display screen of a display device in a photogrammetric image processing apparatus according to a first embodiment of the present invention.

The present invention will be described below with reference to the embodiments shown in the drawings.

FIG. 1 shows a first embodiment of the present invention. This drawing shows a display screen of a display device 10 (FIG. 2) provided in a photogrammetric image processing apparatus. The image display area IMA of the display screen displays in parallel a pair of images IM11 and IM12 including a target T placed on the ground surface. The target T is common in the images IM11 and IM12. The images IM11 and IM12 form a single group (pair 1). Note that while not shown in FIG. 1, paired images of pairs 2 to 4 are defined in addition to the pair 1.

The 8 images of the pairs 1 to 4 including the images IM11 and IM12 are obtained by a digital camera. Specifically, optical images of the object are formed on a CCD or other imaging device (not shown) and stored as digital pixel data in a memory card or other image storage medium.

The work of selecting two images from the large number of images stored in the image storage medium and defining them as belonging to a group is manually performed in advance by the operator. Note that in the first embodiment, two images are made a group, but a group may also include three or more images as well. Further, the number of pairs is not limited to four.

Above the image display area IMA are provided a plurality of paired image selection tags PIMT. By clicking on one of these paired image selection tags PIMT, it is possible to select the paired images to be displayed on the image display area IMA from any of the pairs 1 to 4. The number of paired image selection tags PIMT (=4) shown exactly corresponds to the number of pairs. Further, above the image display area IMA is provided a supplementary menu SM. The supplementary menu SM may be used to select a command such as "CHANGE NAME OF PAIR", "RESET REFERENCE POINT", "CHANGE USER SETTING", "SET WINDOW", etc.

Below the image display area IMA is provided a drawing area DRA in which a survey map based on the 8 images of the pairs 1 to 4 (solid line L showing a contour of a road in the drawing etc. ) is drawn. The survey map is a horizontal plan view of the road seen from above.

Further, the drawing area DRA shows by a dot the target position RP1. The target position RP1 is defined by a reference point (34) provided on the target T. In the images IM11 and IM12, the reference point (34) is displayed as the image points RP1' and RP1". When these images are set to belong to one group, the correspondence between the two is defined by image processing. As a result, the three-dimensional coordinates of the reference point (34) are specified and displayed as the target position RP1 in the drawing area DRA.

The target T is suitably repositioned in accordance with the range to be photographed. The target position RP2 is shown set in the drawing area DRA. The target position RP2 is shown by a relative coordinate having the target position RP1 as an initial value. The relative coordinate is measured by a sensor (not shown) built into the target T, transmitted from the target T to the camera, and recorded together with the image data (digital pixel data). Due to this, when the pairs 1 to 4 are linked, the different target positions RP1 and RP2 are displayed in the same drawing area DRA.

A plurality of pairs (or at least one pair) of images are taken of the target T in the same position. The pairs 1 to 3 are images obtained when the target T is placed at the target position RP1. Similarly, the images of the pair 4 capture the target T placed at the target position RP2.

When making the survey map, the corresponding image points in the paired images are designated manually. More specifically, when the image points OP1' and OP1" of a first corner of the road in the images IM11 and IM12 are designated manually by a mouse, the three-dimensional coordinates of the physical point OP1 corresponding to these image points OP1' and OP1" are calculated and the physical point OP1 is displayed by a dot in the drawing area DRA. Similarly, by manually designating image points OP2' and OP2" of a second corner, the physical point OP2 is displayed by a dot in the drawing area DRA.

Thus, the image display area IMA and the drawing area DRA are displayed on the same display screen, the paired images, in which the image points are to be designated, are indicated in the image display area IMA, and the survey map is displayed in the drawing area DRA, so that the designation of the image points in the paired images and the correspondence between the image points and the physical points indicated in accordance with the image points, are easily recognized. Further, since all of the images belong to one group are displayed in parallel in the image display area IMA, the photographing position is easily recognized. Especially, when the operator and the photographer are identical, the photographing situation can be easily recalled, so that the work efficiency is improved.

Regarding survey precision, a valid mapping range VR is defined for every paired map, and the precision of the physical points is guaranteed in the valid mapping range VR. The valid mapping range VR is obtained by superposing ranges of guaranteed precision corresponding to the two images, and the guaranteed precision ranges are obtained based on the characteristics of the camera, the position of the camera, the optical axis of the camera, and the other factors.

In the drawing area DRA of FIG. 1, a valid mapping range VR1 corresponding to the pair 1 indicated in the image display area IMA is shown as an area enclosed by a one-dot chain line, and valid mapping ranges VR2, VR3 and VR4 corresponding to the pairs 2,3 and 4 are shown as areas enclosed by broken lines. Note that, although boundary lines of the valid mapping ranges VR1 to VR4 are shown in FIG. 1, it is possible to set the display screen in such a manner that the valid mapping ranges VR1 to VR4 are not shown.

When the pair 4 is selected from the paired image selection tag PIMT, for example, the paired images displayed in the image display area IMA are changed from the pair 1 to the pair 4, and in accordance with the change of the displayed images, the valid mapping range VR1 is changed to be indicated by a broken line, and the valid mapping range VR4 is changed to be indicated by a one-dot chain line. Alternatively, it is possible that an arbitrary point in the valid mapping range VR4 is clicked using the mouse, so that the types of lines of the valid mapping ranges VR1 and VR4 are changed and the paired images displayed in the image display area IMA are changed from the pair 1 to the pair 4 in accordance with the change of the line type. Note that, instead of the change of the line type, the displayed paired images may be changed in accordance with displaying or not displaying the boundary lines.

The drawing area DRA is provided with a menu DRM for mapping. The menu DRM allows the selection of commands such as "DRAW STRAIGHT LINE", "DRAW POLYGON", "DESIGNATE DIAMETER AND DRAW CIRCLE", "DESIGNATE RADIUS AND DRAW CIRCLE", "DRAW AUXILIARY POINT", and "END INPUT". For example, when "DRAW STRAIGHT LINE" is selected, if the physical points OP1 and OP2 are consecutively designated, the line L1 connecting the two points OP1 and OP2 is automatically produced and displayed in the drawing area DRA.

At the left side of the image display area IMA and drawing area DRA is provided a main menu MM. Inside the main menu MM are provided a command menu CM, magnification setter MG, rotation setter RT, and display setter DT. The command menu CM allows the selection of commands such as "DRAW ROAD CONTOUR", "ENTER CONTRACTOR ID", "ENTER GRAPHIC ID", "ENTER ID", "ENTER TEXT", "SURVEY", "EDIT IDS AND GRAPHICS", "RESTORE ORIGINAL", "ERASE", "STORE DRAWING", "SET PRINTING", "PRINT DRAWING", and "CORRECT DRAWING". The magnification setter MG can suitably set the magnification rate in the drawing area DRA, while the rotation setter RT can suitably set the rotation of the survey map etc. displayed in the drawing area DRA. Further, the display setter DT switches between displaying and not displaying the valid mapping areas VR and sets changes in the line type, line width, color, etc. of the boundary lines.

In this embodiment, when an arbitrary point is designated in the drawing area DRA, the paired images, corresponding to the valid mapping range VR containing the designated point, are displayed, and thus, the efficiency of the manual operation of the operator is drastically improved. Specifically, when the physical point OP1 is intended to be designated, a cursor (an arrow in black in the drawing) is moved, using a mouse, to a point SP which is coincident with the physical point OP1 or close thereto in the drawing area DRA, and in this state, a trigger action, such as a click or a key operation in which a keyboard is operated, is carried out. In this state, the exact position of the physical point OP1 in the drawing area DRA is unknown. The designated point SP indicated by the cursor is contained in each of the valid mapping ranges VR1, VR2 and VR3. In response to the trigger action, the valid mapping ranges VR1, VR2 and VR3 are sequentially changed to be indicated by one-dot chain lines. At the same time, the pairs 1, 2 and 3 are sequentially displayed in the image display area IMA to correspond to the selected valid mapping ranges.

The display of the valid mapping range VR is useful and effective when no survey map is indicated on the display screen. However, when a survey map (a solid line L in FIG. 1) is indicated to some extent, the drawing area DRA becomes complex since these valid mapping ranges VR and the survey map are superimposed on the screen. In this case, the valid mapping ranges VR may be set to be not displayed, by operating the display setter DT, and when the valid mapping ranges VR are not displayed, only a change of indication of the image display area IMA is carried out by the trigger action.

Thus, paired images, in which the image points OP1' and OP1" corresponding to the physical point OP1 are designated, can be freely selected from any one of the paired images 1, 2 and 3. In FIG. 1, although the image points OP1' and OP1" are designated using the pair 1, the other pairs 2 and 3 can be utilized to obtain a sufficiently high survey precision.

When designating the image points, the image points may be in a shadow of a building, for example, which may make difficult the designation of the image points even if the image points are contained in a valid mapping range VR. However, in the embodiment, when there is a plurality of valid mapping ranges VR available for the designation of a physical point, since paired images, can be changed and displayed on the display screen by the trigger action, the best paired images for the designation can be easily selected from all of the paired images.

Conventionally, the operator has selected paired images from paired images containing the image points, by which a sufficient precision can be obtained, taking the survey precision into consideration. Therefore, the operator has been required to be skillful. Conversely, according to the embodiment, the operator needs only to designate a point SP, which is to be mapped in the drawing area DRA, and since the paired images corresponding to the designated point SP are automatically displayed on the image display area IMA, the operator does not need to select the paired images for designating the image points. Accordingly, a manual operation to designate the image points in the paired images, the image points corresponding to the physical point which is to be mapped, becomes simplified, so that a work efficiency is largely improved. Further, since, in the paired images displayed on the image display area IMA, the survey precision of the designated point SP is guaranteed, a high precision survey map can be obtained.

Further, conventionally, when the survey is performed over a wide area, survey maps obtained from a large number of paired images are connected to each other, and therefore it is hard to recognize, when mapping, which portion in the surveyed range is indicated by the obtained survey map, which then requires the designation of many physical points. Conversely, according to the embodiment, since the drawing areas of all of the paired images are displayed on the single display screen, the designation of the physical points on different paired images can be easily carried out, and the designation need not be carried out more times than needed, so that the work efficiency is improved.

Figure 2:
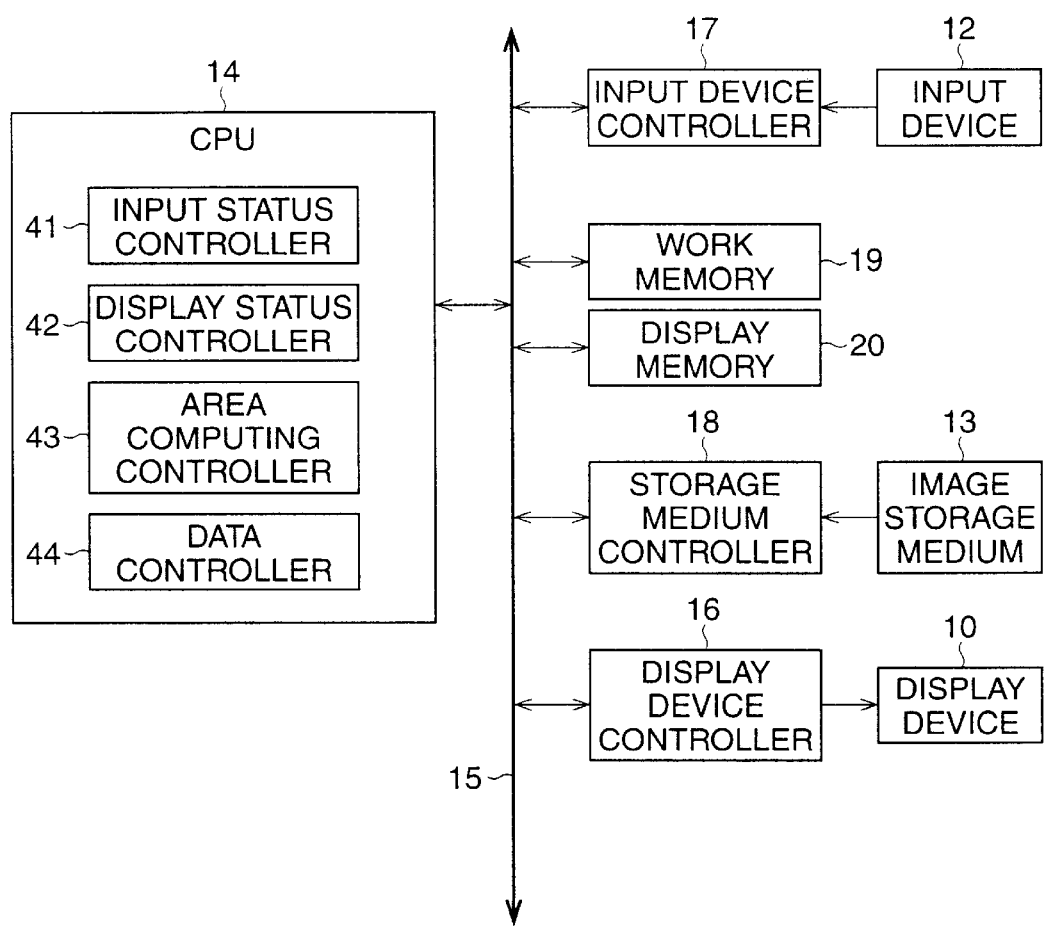
FIG. 2 is a block diagram of the overall configuration of a photogrammetric image processing apparatus.

FIG. 2 is a block diagram of the overall configuration of the photogrammetric image processing apparatus. It has, in addition to the display device 10 showing the content of the display in FIG. 1, an input device 12 such as a keyboard, a mouse or the like, an image storage medium 13 such as a memory card or the like, and a CPU 14. These are connected directly or indirectly to a bus 15.

The CPU 14 is provided with an input status controller 41, a display status controller 42, an area computing controller 43, and a data controller 44 and executes the necessary control, computation, and processing. The input device 12 is connected to an input device controller 17 connected to the bus 15, whereby inputs from the input device 12 are transferred to the bus 15 or the input mode etc. of the input device 12 is set. The image storage medium 13 is inserted in a memory card reader or other storage medium controller 18, whereby the photo data (FIG. 3) stored in the image storage medium 13 is suitably read out.

Further, the bus 15 is connected to a work memory 19 and display memory 20. The work memory 19 is used as a cache memory etc. for computation and processing by the CPU 14, while the display memory 20 holds the content (FIG. 1) to be displayed on the display device 10. The display device 10 is connected to a display device controller 16 connected to the bus 15, while the display device controller 16 converts the digital data in the display memory 20 to an analog RGB signal for the display device 10.

The input status controller 41 of the CPU 14 controls the settings of the input device 12 or converts the input information, for example, mouse coordinates or alphanumerics input from the keyboard, into predetermined digital data. The display status controller 42 controls the content to be displayed on the display device 10 and changes the content of the display when there is a change in the settings of the display etc. The area computing controller 43 is used for the later explained image processing, calculation of coordinates, etc. A data controller 44 controls the content of the data read from the image storage medium 13 or controls the content of settings of the paired images set on the screen of FIG. 1, the various coordinate data prepared based on this, the data of the survey map made, etc.

Figure 3:
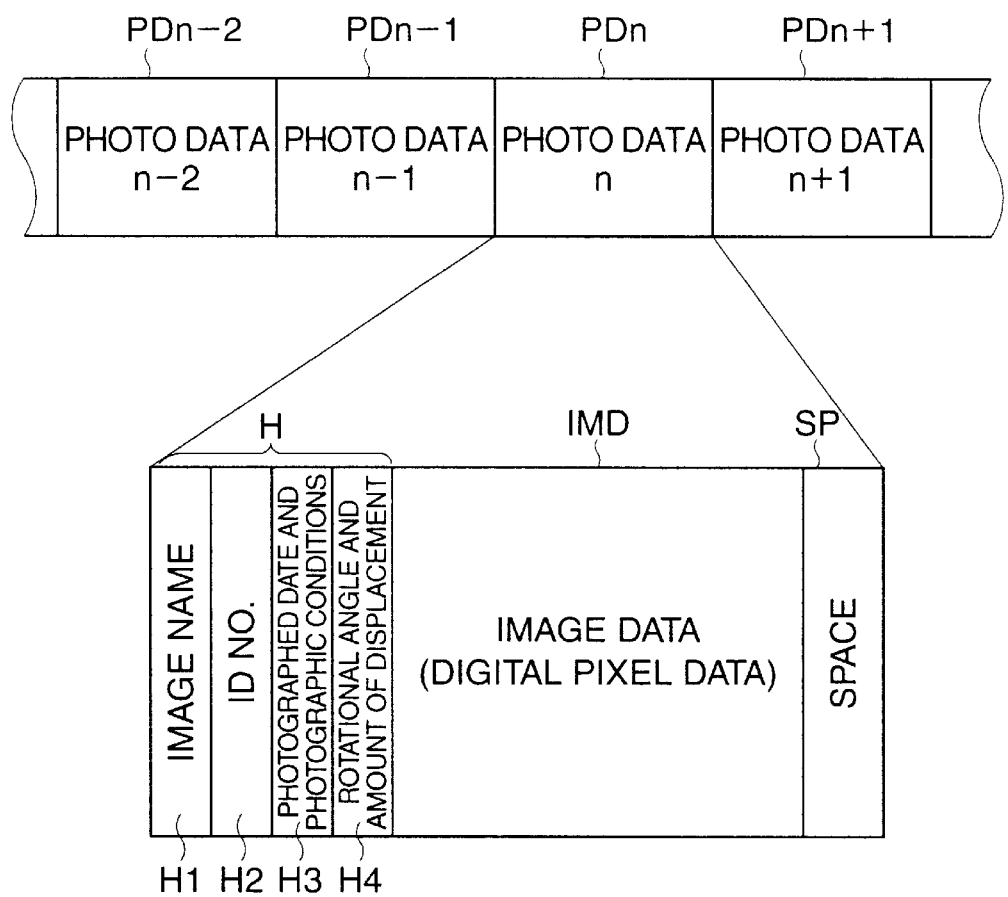
FIG. 3 is a schematic view of the format of photo data stored in an image storage medium of FIG. 2.

FIG. 3 is a view of the format of surveyed photo data stored in the image storage medium 13. A plurality of sets of photo data (in FIG. 3, the (n=2)th to (n+1)th photo data are shown) are successively stored. One set of photo data (n-th) is comprised of a header H and image data IMD and is provided with a spare space SPS after the image data IMD for separation from the adjoining photo data. The image data IMD is a string of digital pixel data.

The header H includes an image name H1, ID no. H2, photographed date and photographic conditions H3, rotational angle and amount of displacement H4, etc. The image name H1 and photographed date in the photographed date and photographic conditions H3 are input manually into the camera. The ID no. H2 includes for example a photographic position no. incremented by "1" with every shot taken and a target position no. incremented by "1" at the time of relocation of the target T, and is used for selection of paired images which were manually paired by the operator, calculation of valid mapping ranges, etc. The photographic conditions in the photographed date and photographic conditions H3 are input from the camera at the time of photographing and include the focal distance f of the camera, the horizontal and vertical direction angle of views $\Theta h$ and $\Theta v$, the CCD resolution power rp, etc. In the rotational angle and amount of displacement H4, the rotational angle includes the rotational angle and azimuth of the target with respect to the horizontal plane at the time of photography, while the amount of displacement is the amount of displacement from the initial target position RP1 (FIG. 1). Signals of the rotational angle and amount of displacement are transmitted from the target T included in the image to the camera.

Figure 4:
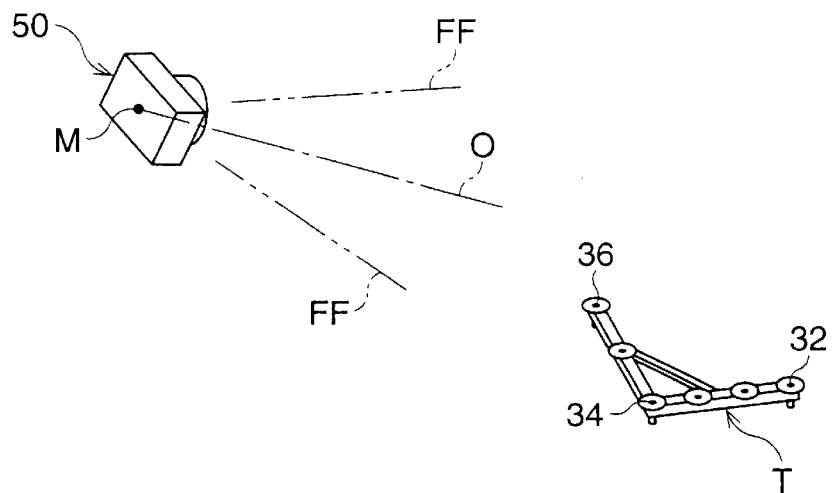
FIG. 4 is a perspective view of the state of photographing an image to be processed by the photogrammetric image processing apparatus of FIG. 2.
Figure 5:
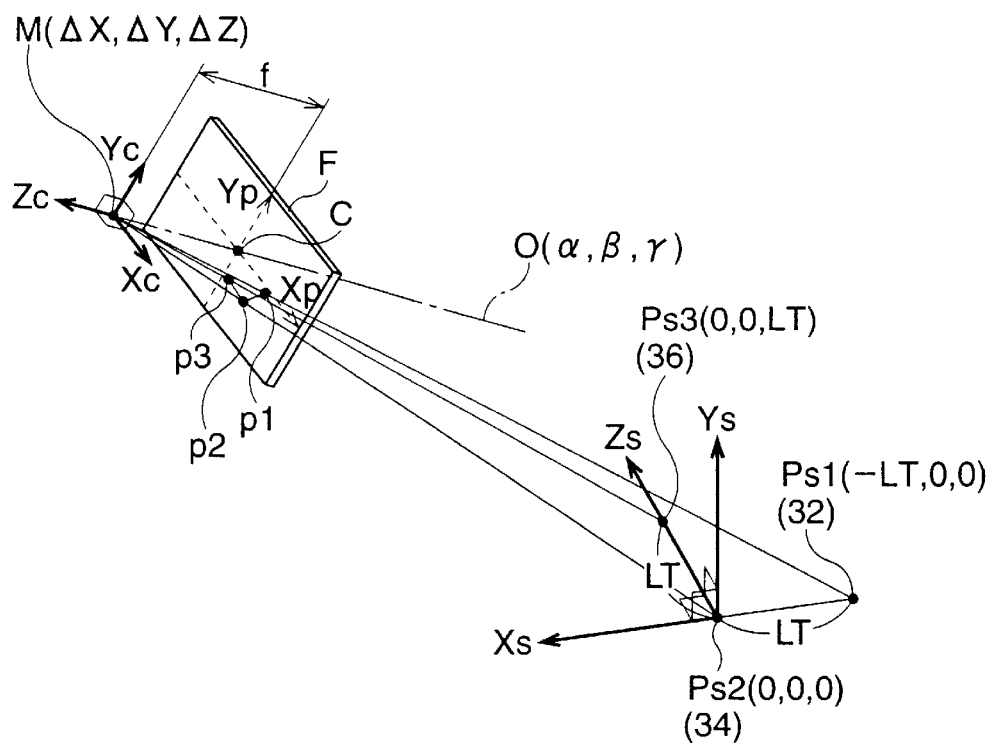
FIG. 5 is a perspective view schematically showing the relationship among an image, camera position, and target under the photographing conditions of FIG. 4.
Figure 6:
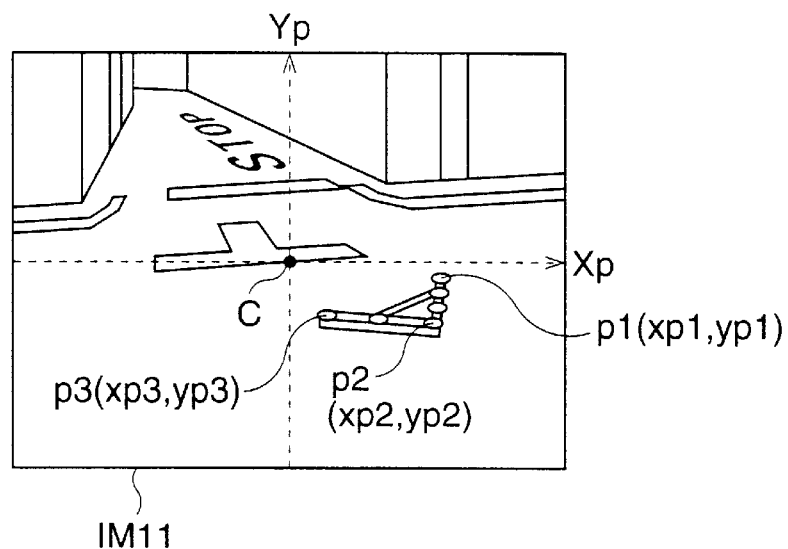
FIG. 6 is a schematic view of an image obtained under the photographing conditions of FIG. 4.

An explanation will be given next of the calculation of the camera position using the target T referring to FIG. 4 to FIG. 6. FIG. 4 is a perspective view of the photographic conditions of the image IM11 (FIG. 1) for the camera. FIG. 5 is a perspective view schematically showing the relationship of the image and the photographed object obtained by the photographic conditions. FIG. 6 is a schematic view of the image IM11. In the camera 50, an optical image is converted to an electronic image through a CCD not shown.

In FIG. 4, the camera 50 captures the target T in the angle of view (the boundary shown by FF). The target T is provided with the reference point members 32, 34, and 36 showing the reference points. The target T is formed as a right angle L-shape having the reference points 32, 36 as end points and the reference point 34 as an angle. The length between the reference points 32 and 34 and the length between the reference points 34 and 36 are both the length LT (FIG. 5). Note that in the drawing, the point M shows the rear principal point position (camera position) of the photographic optical system of the camera 50, while the one-dot chain line O shows the optical axis of the camera 50.

As shown in FIG. 5, when the image of the target T is formed on the image plane F of the camera 50, the optical axis O passes through the camera position M and the photographic center C of the image plane F, while the image points p1, p2, and p3 of the reference points 32, 34, and 36 projected on the image plane F are positioned on the lines connecting the camera position M and the reference points 32, 34, and 36.

As shown in FIG. 5 and FIG. 6, a photographic coordinate system (Xp,Yp) having the photographic center C as its origin (0,0) is defined for the image plane F. The twodimensional coordinates of the image points p1, p2, and p3 in this photographic coordinate system are respectively p1 (xp1, yp1), p2 (xp2, yp2), and p3 (xp3, yp3).

Further, in FIG. 5, the three-dimensional coordinate system having the camera position M as its origin (0,0,0) is defined as the camera coordinate system (Xc,Yc,Zc), the Xc axis and Yc axis are parallel to the Xp axis and Yp axis of the photographic coordinate system, and the Zc axis matches with the optical axis O.

If the three-dimensional coordinates of the reference points 32, 34, and 36 in the camera coordinate system are defined as Pci (Pcxi,Pcyi,Pczi) (where, i=1 to 3), the relationship between the image point, that is, the photographic coordinates pi (xpi,ypi), and the camera coordinates Pci (Pcxi,Pcyi,Pczi) of the reference point is shown by equation (1) and equation (2). Note that in equation (1) and equation (2), f is the focal distance of the camera 50:

$$xpi = f \times \frac{Pcxi}{Pczi} \quad (i = 1\sim3) \tag{1}$$

$$ypi = f \times \frac{Pcyi}{Pczi} \quad (i = 1\sim3) \tag{2}$$

Further, in FIG. 5, the three-dimensional coordinate system having the reference point 34 of the target T as its origin is set as the first scene coordinate system (Xs,Ys,Zs). The Xs axis and Zs axis of the first scene coordinate system run along the sides of the reference points 34, 32 and reference points 34, 36, while the Ys axis is perpendicular to the Xs axis and Zs axis. When the target T is placed on an inclined surface, the rotational angles (H4 of FIG. 3) of the Xs axis and Zs axis with respect to the horizontal plane are stored along with the image data. Due to this, the inclinations of the Xs axis and Zs axis are corrected. Therefore, the Ys axis is made to match with the perpendicular direction, while the Xs-Zs plane is made to match with the horizontal plane.

Here, if the coordinates of the camera position M in the first scene coordinate system are defined as $(\Delta X,\Delta Y,\Delta Z)$ and the inclination of the optical axis O as $(\alpha,\gamma,\gamma)$, the relationship between the camera coordinates Pci (Pcxi,Pcyi,Pczi) and the scene coordinates Psi (Psxi,Psyi,Pszi) is shown by equation (3):

$$Pci = R \times (Psi - \Delta) \tag{3}$$

$$R = \begin{bmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\cos\gamma & -\cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{bmatrix} \tag{4}$$

Note that R in equation (3) is a rotational matrix and, as shown in equation (4), is displayed by the directional cosines $\cos\alpha$, $\cos\beta$, and $\cos Y$ of the optical axis O (Zc axis). Further, the $\Delta$ in equation (3) is the amount of displacement of the origin of the coordinates and matches with the scene coordinates $(\Delta X,\Delta Y,\Delta Z)$ of the camera position M.

In actuality, the reference point members 32, 34, and 36 are shown in white, while the target T is shown in black. When reading the image IM11 from the image storage medium 13 into the CPU 14, binary processing or other image processing is performed to automatically extract the reference points 32, 34, and 36 and find the photographic coordinates pi (xpi,ypi) (i=1 to 3). Further, the scene coordinates of the reference points 32, 34, and 36 in the first scene coordinate system are respectively Ps1 (-LT,0,0), Ps2 (0,0,0), and Ps3 (0,0,LT) (FIG. 5). From these values, using the successive approximate (or iteration) method, the camera position M $(\Delta X,\Delta Y,\Delta Z)$ in the scene coordinate system and the inclination $(\alpha,\beta,\gamma)$ of the optical axis O are calculated.

The six parameters of the camera position M $(\Delta X,\Delta Y,\Delta Z)$ and the inclination $(\alpha,\beta,\gamma)$ of the optical axis O are called the camera parameters in this specification. The camera parameters of the other image IM12 in the pair 1 are also found by the same technique as the camera parameters of the image IM11.

Next, the survey precision of the pair 1 is evaluated based on the camera parameters of the image IM11 and image IM12. To evaluate the survey precision, the vertical direction angle of view $\Theta v$ and horizontal direction angle of view $\Theta h$ of the camera 50 and the CCD resolution power rp of the camera 50 are further used. These three parameters are stored in the header H3 (photographic conditions) of FIG. 3. The above parameters are used to determine the valid mapping range VR in the horizontal plane (Xs-Zs plane in the scene coordinate system).

Figure 7:
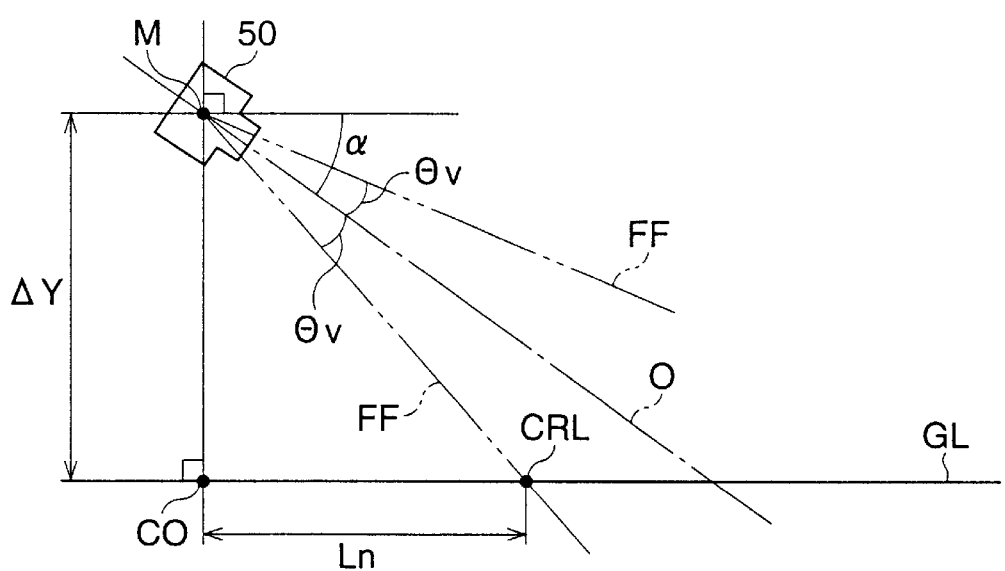
FIG. 7 is a schematic view of processing for determining a near limit of guaranteed precision to be found based on the image of FIG. 6 and showing the camera position and vertical direction angle of view.

FIG. 7 is a side standing view schematically showing the camera position M in a scene coordinate system and vertical direction angle of view $\Theta v$. In the drawing, the camera 50 is shown present at a position of a height $\Delta Y$ (Y component of $\Delta$) from the ground surface GL and the inclination of the optical axis O with respect to the Xs axis is shown as a. Here, if the foot of the vertical line dropped from the camera 50 to the ground surface GL is defined as CO and the minimum length from the crossing line CRL of the boundary FF of the angle of view and ground surface to the foot CO of the vertical line is defined as Ln, a sufficient survey precision cannot be obtained in an area nearer the camera 50 than Ln. This Ln, that is, the near limit of guaranteed precision, is calculated from equation (5):

$$Ln = \Delta Y + \cot(\alpha + \Theta v) \tag{5}$$

Figure 8:
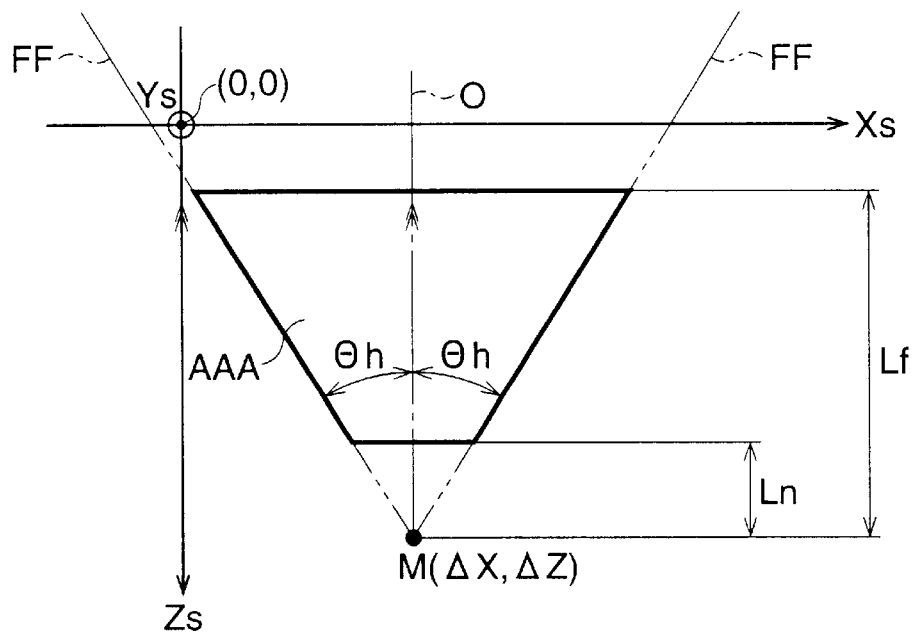
FIG. 8 is a plan view of a range of guaranteed precision found based on the image of FIG. 6.

FIG. 8 is a plan view of the range of guaranteed precision for one camera. The camera position M $(\Delta X,\Delta Y)$, near limit Ln of guaranteed precision, optical axis O, and angle of view boundary FF are shown on an Xs-Zs plane of the scene coordinate system having the reference point 34 as its origin. As explained with reference to FIG. 1, a pair of images is selected to be used for the mapping as the paired images. Here, if the distance (reference line length) between the two camera positions M is B and the allowable error AE is set to a predetermined value, the far limit Lf of the distance enabling guarantee of precision (far limit of guaranteed precision) is calculated from equation (6):

$$Lf = \sqrt{\frac{AE \cdot B \cdot f}{rp}} \tag{6}$$

If the area spread by exactly the horizontal direction angle of view $\Theta h$ from the optical axis O is delineated by the near limit Ln of guaranteed precision and the far limit Lf of guaranteed precision, the trapezoidal area extending from the camera position M toward the far side, that is, the range of guaranteed precision AAA, is obtained.

The allowable error AE may be suitable changed. When desiring to obtain a high precision survey map, it is set to a small value. In this case, the far limit Lf of guaranteed precision becomes small and the range of guaranteed precision AAA also shrinks. Conversely, when not such a high precision of the survey map is demanded, the allowable error AE is set to a large value, whereby the range of guaranteed precision AAA is expanded.

Figure 9:
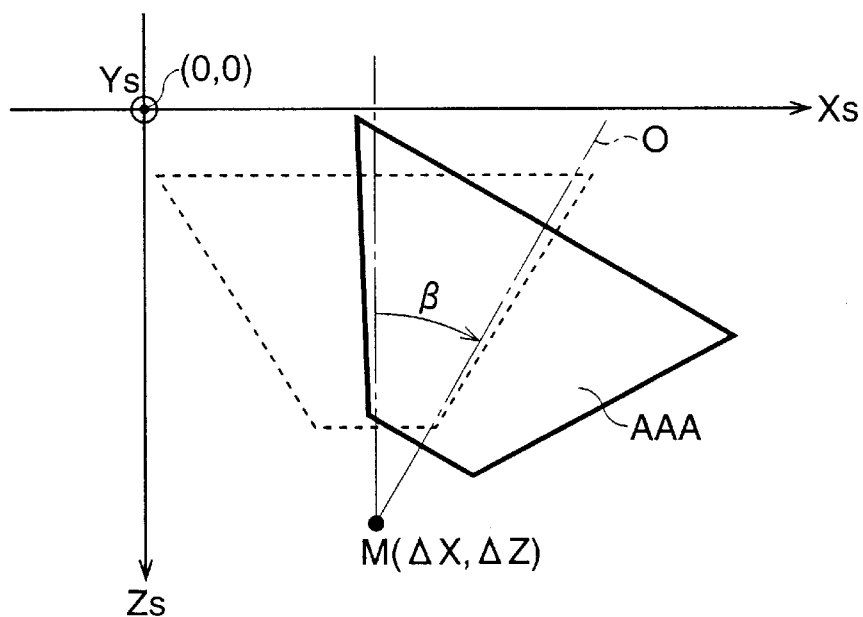
FIG. 9 is a schematic view of the state of rotation of the range of guaranteed precision shown in FIG. 8.

In FIG. 8, the optical axis O is deemed as (approximated as) being parallel to the Zs axis, but considering the rotation of the optical axis O around the Ys axis, as shown in FIG. 9, the range of guaranteed precision AAA is rotated exactly by the angle β about M (ΔX,ΔY).

The range of guaranteed precision AAA is calculated for every image and two ranges of guaranteed precision AAA are obtained for each paired images. One valid mapping range VR is determined based on these two ranges of guaranteed precision AAA. Note that in the present embodiment, the range of guaranteed precision AAA is found by computation, but it is also possible to determine the range of guaranteed precision AAA by the operator determining the limits Ln, Lf of guaranteed precision and angle of view eh to any values.

Figure 10:
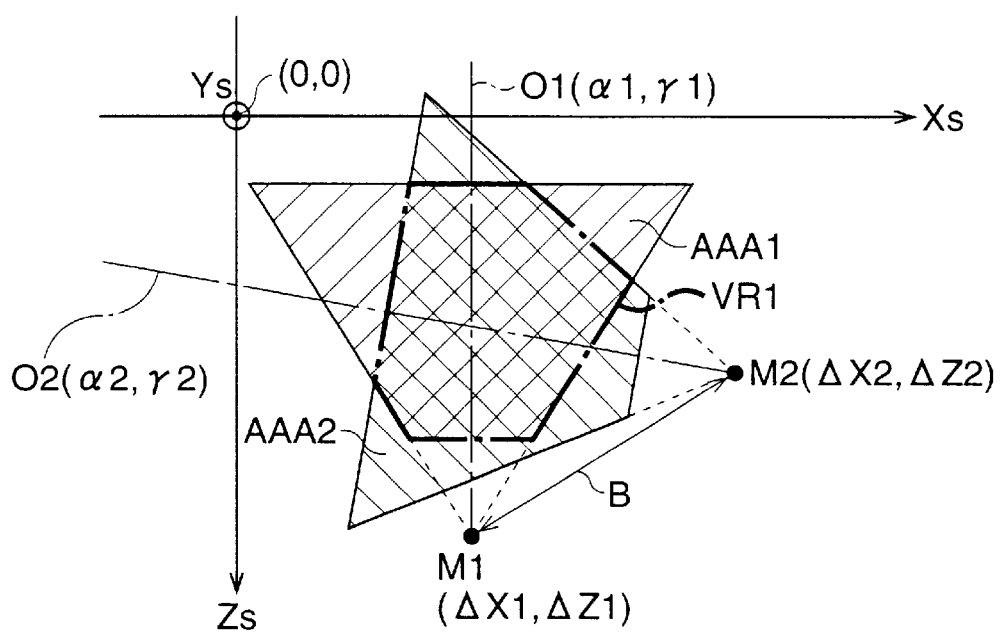
FIG. 10 is a schematic view of the processing for determining a valid mapping range from two ranges of guaranteed precision.

FIG. 10 is a schematic view of processing for generation of the valid mapping area VR and an Xs-Zs plan view of the scene coordinate system. The two camera positions corresponding to the images IM11 and IM12 are shown by M1 and M2, while the optical axes are shown by O1 and O2. The drawing has the ranges of guaranteed precision AAA1 and AAA2, regarding the camera positions M1 and M2, which are present in a superimposed state. The overlapping area of the two ranges of guaranteed precision AAA1 and AAA2 is determined as the valid mapping range VR1, while its boundary is shown by a one-dot chain line. Inside the valid mapping range VR1, the precision is guaranteed when using the survey results of the two images together and a high precision survey map can be prepared.

Note that the valid mapping range VR1 is produced as follows: that is, the ranges of guaranteed precision AAA1 and AAA2 are produced in advance as label images and predetermined new label values are generated for the scene coordinates where significant label values (label values not background pixels) are present in both of the two ranges of guaranteed precisions AAA1 and AAA2. Further, the graphic produced by the new label values is determined as the valid mapping range VR1.

For the pair 1, one valid mapping range VR1 is calculated for two images IM11 and IM12. Similarly, the valid mapping ranges VR2, VR3 and VR4 are calculated for the pairs 2 to 4. However, the scene coordinate system is based on the target position RP1 or RP2, and is different from each other in each of the paired images. Therefore, to correlate all the valid mapping ranges VR with each other in one drawing area DRA shown in FIG. 1, it is necessary to standardize the coordinate systems of all the paired images. Here, the first scene coordinate system is determined as the reference coordinate system and the second scene coordinate system is converted.

Figure 11:
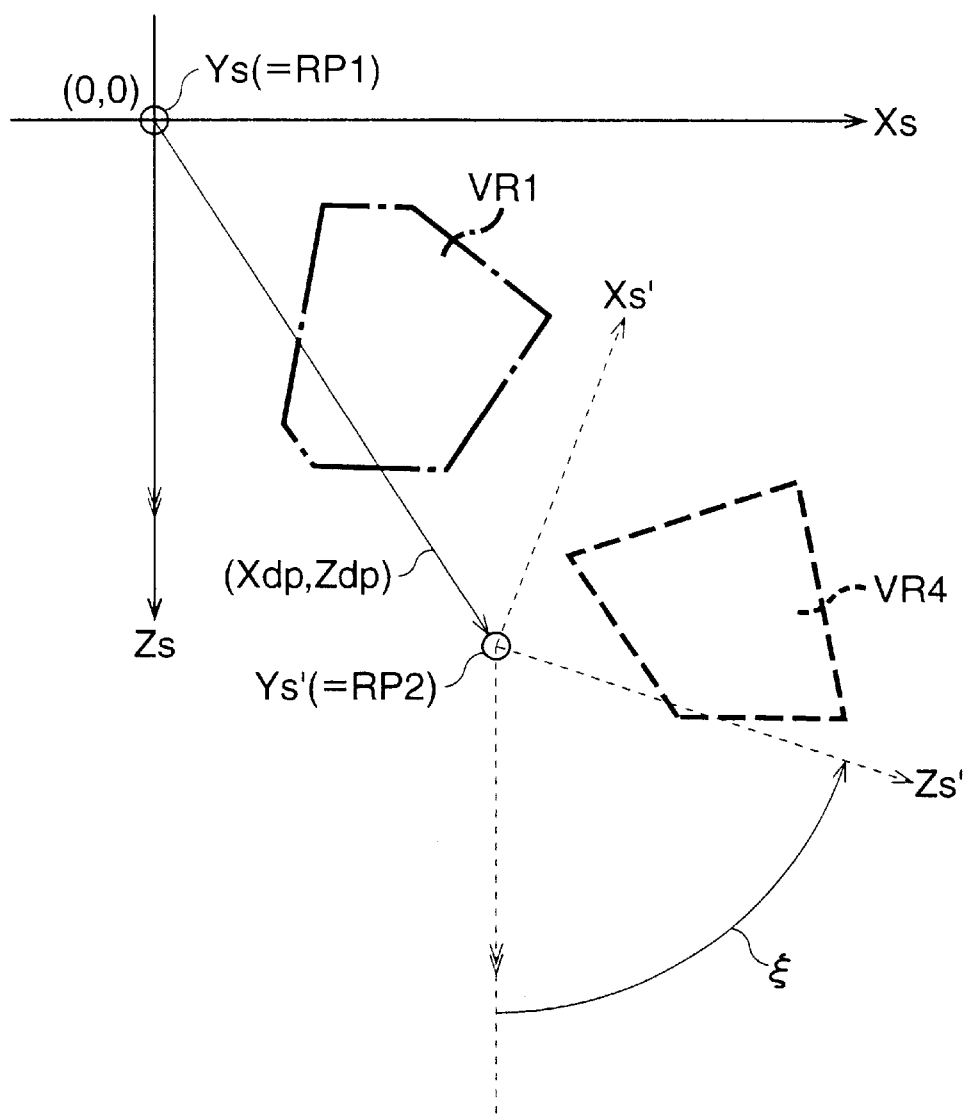
FIG. 11 is a schematic view of the state of converting one scene coordinate system to a reference coordinate system.
Figure 12A:
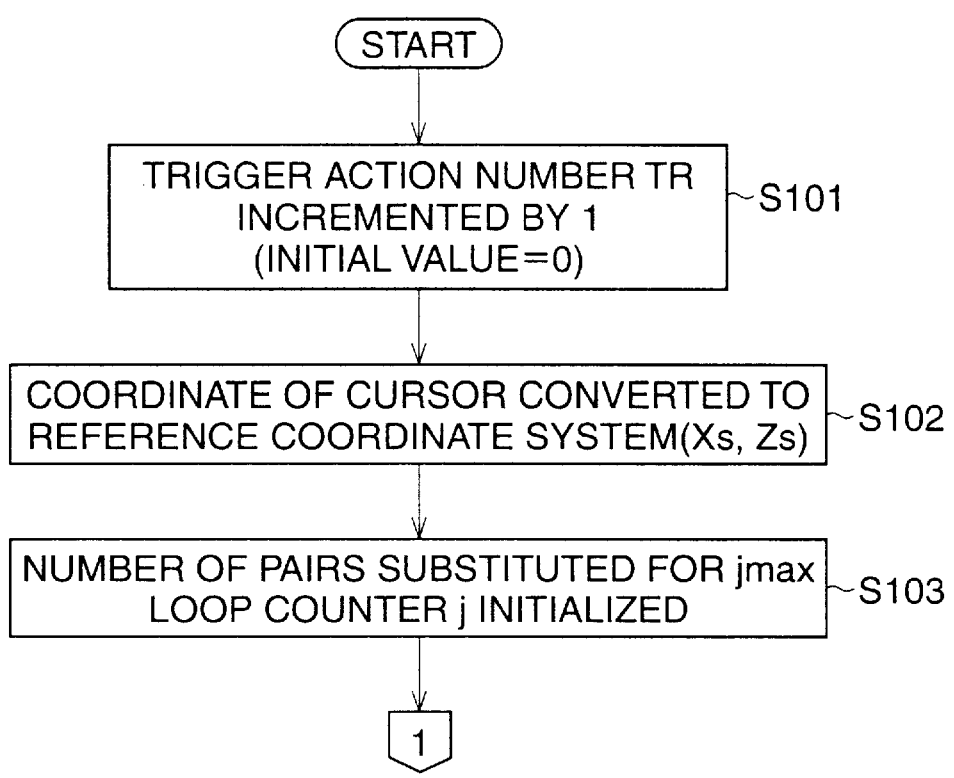
FIGS. 12A, 12B and 12C are flow charts of an image switching and display processing routine, executed by a CPU shown in FIG. 2.
Figure 12B:
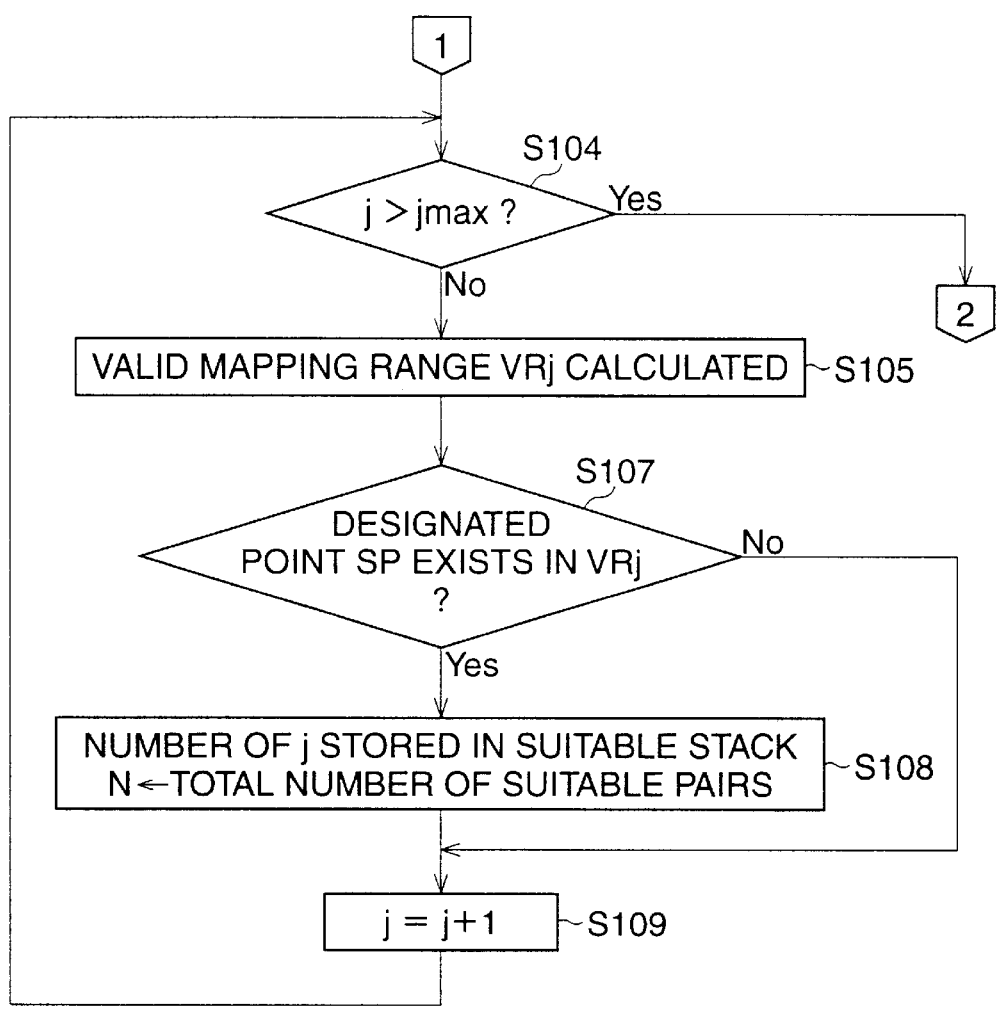
Figure 12C:
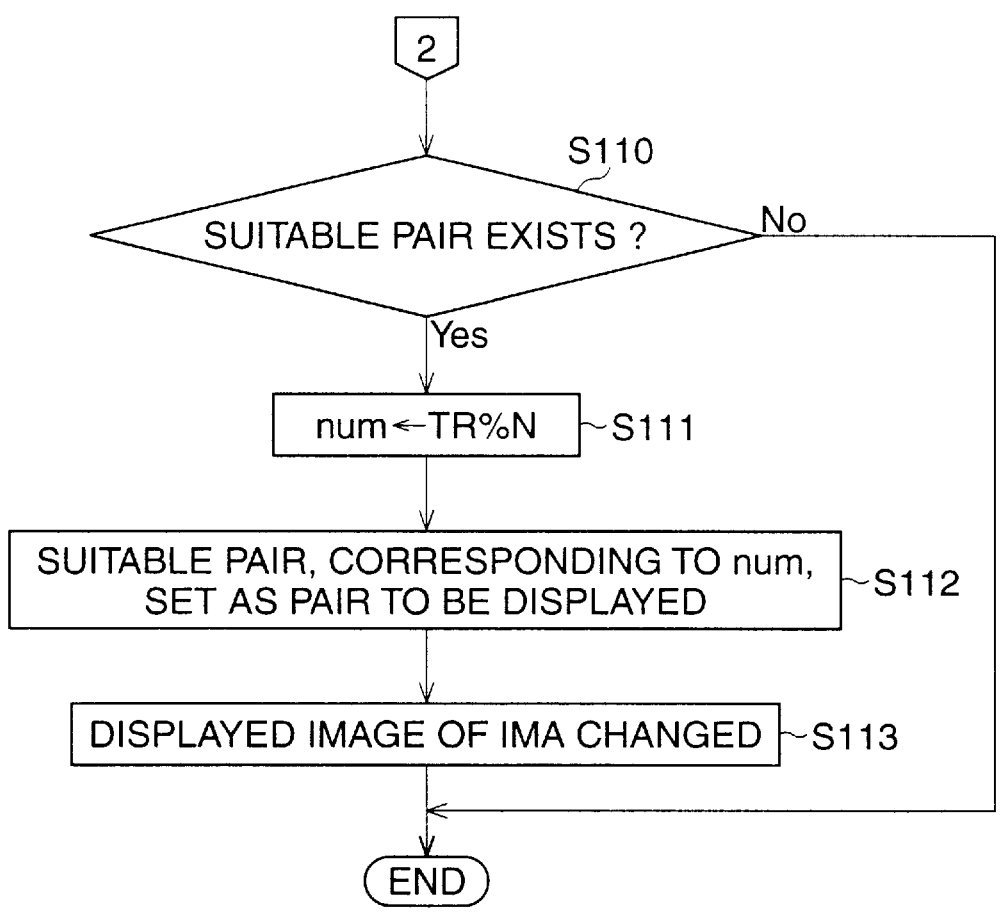

FIG. 11 is a schematic view of the state of conversion of the coordinates of the valid mapping range VR4 (Xs, Zs) of the second scene coordinate system (Xs', Zs') to the reference coordinate system (the valid mapping range VR1). The amount of relative displacement from the target position RP1 to the target position RP2 is shown by (Xdp, Zdp), while the angle of rotation of the Xs' axis with respect to the Xs axis (or the Zs' axis with respect to the Zs axis) is shown by ξ. The equation for conversion is shown by equation (7). Note that the amount of relative displacement and angle of rotation are found based on the parameters stored in the header H:

$$\begin{bmatrix} Xs \\ Zs \end{bmatrix} = \begin{bmatrix} \cos\xi & -\sin\xi \\ \sin\xi & \cos\xi \end{bmatrix} \begin{bmatrix} Xs' \\ Zs' \end{bmatrix} + \begin{bmatrix} Xdp \\ Zdp \end{bmatrix} \quad (7)$$

Due to this conversion of coordinates, the valid mapping range VR4 can be displayed by the reference coordinates (Xs,Zs). Note that when there is displacement of the target position RP2 in the perpendicular direction to the target position RP1, suitable correction is performed based on the parameters stored in the header H, but this is actually a negligible amount of error.

Due to the above processing, it is possible to display all valid mapping ranges in one drawing area DRA (FIG. 1).

Figure 13:
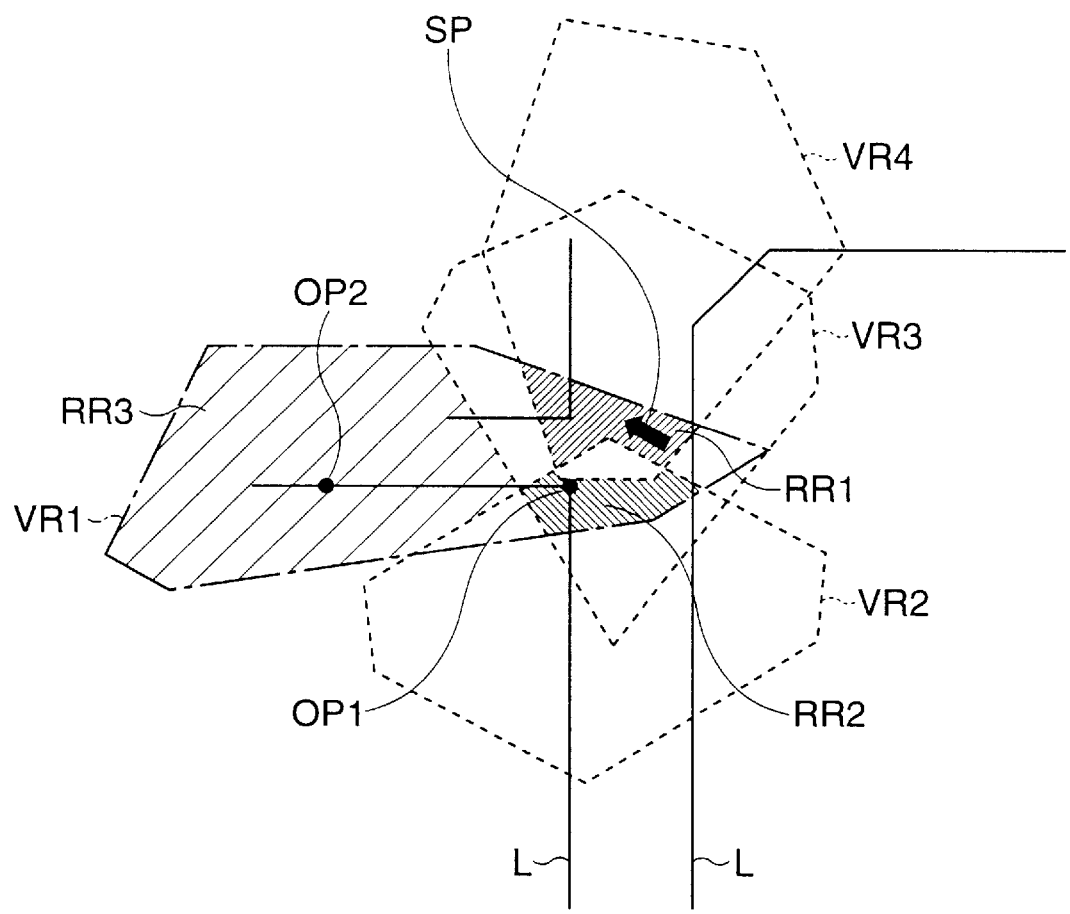
FIG. 13 is an enlarged view of a drawing area DRA shown in FIG. 1.

With reference to the flow charts of FIGS. 12A, 12B and 12C and FIG. 13, the image switching and display processing routine, by which paired images corresponding to the valid mapping range VR (FIG. 1) containing an arbitrary designated point SP is changed and displayed and which is executed by the CPU 14 (FIG. 2), will be explained below. FIG. 13 is an enlarged view of the drawing area DRA shown in FIG. 1.

In the photogrammetric image processing apparatus, the position of a cursor, which is moved on the display screen by the input device 12 (i.e., a mouse), is always detected, so that, when the cursor is positioned within the drawing area DRA and a movement of the cursor or an execution of a predetermined trigger action is sensed, the image switching and display processing routine is executed, and thus an image switching and display, which corresponds to the number of the trigger actions, is performed. The trigger action is a click of the mouse, or a strike of a predetermined key of the keyboard, for example.

Here, as an example, a process in which, after the cursor is moved to the area RR1 of FIG. 13, the trigger action is first carried out, is described. When the cursor is moved, a trigger action number TR, which is a variable for counting the number of the trigger actions, is initialized to an initial value 0.

When a trigger action is carried out while the cursor indicates a predetermined position in the area RR1, step S101 is executed in which the trigger action number TR is incremented by 1 to become 1.

Then, in step S102, the coordinate of the cursor on the display screen is converted to the reference coordinate system (Xs, Zs) shown in FIG. 11, so that the coordinate of the cursor becomes correspondent to the reference coordinate of the designated point SP in the drawing area DRA.

At step S103, a number of defined pairs (=4) is substituted for a variable jmax, and a loop counter j is initialized such that an initial value "1" is substituted for the loop counter j. The loop counter j is provided for determining whether the valid mapping range VR contains the designated point SP, for all of the paired images.

Then, a loop composed of steps S104, S105, S107, S108 and S109 is executed j (=4) times, so that, in the valid mapping ranges VR1, VR2, VR3 and VR4 of the pairs 1 to 4, only the valid mapping ranges containing the designated point SP are stored in a suitable pair stack.

That is, regarding j which is incremented at step S109, the valid mapping range VRj of the pair j is calculated at step S105, and it is determined at step S107 whether the designated point SP exists in the valid mapping range VRj. When the designated point SP exists in the valid mapping range VRj, the pair j is stored in the suitable pair stack as a suitable pair, and a total number of suitable pairs stored in the suitable pair stack is substituted for a variable N at step S108. Conversely, when the designated point SP does not exist in the valid mapping range VRj, the pair j is not stored in the suitable pair stack. Then, j is incremented at step S109, and it is determined at step S104 whether the determination for all of the pairs has been completed.

In the suitable pair stack, as shown in FIG. 14, an index is numbered from 0, referring to the suitable pair j stored.

When it is determined at step S104 that the determination for all of the pairs 1 to 4 has been completed, the process goes to step S110, so that the paired images (pair 1, pair 3 and pair 4), corresponding to the valid mapping ranges (VR1, VR3 and VR4) containing the designated point SP, is indicated.

That is, it is determined at step S110 whether a suitable pair exists, and when no suitable pair exists, the image switching and display processing routine ends. Conversely, when it is determined at step S110 that a suitable pair exists, step Sill is executed in which the trigger action number TR (=1) is divided by the total number of suitable pairs (=3) to obtain a surplus value (=1) of the division, and the surplus is substituted for a variable num. Then, at step S112, the suitable pair (=3) in which the index is coincident with the variable num is set as the pair which should be displayed. At step S113, the displayed image of the image display area IMA is changed from the initially displayed pair 1 to the pair 3. Thus, the image switching and display processing routine ends.

FIG. 15 shows a table showing a relationship among the trigger action number TR, the variable num and a pair which is changed to be displayed on the display screen. When the total number of the suitable pair N=3, the variable num=1 if the trigger action number TR=1, the variable num=2 if the trigger action number TR=2, and the variable num=0 if the trigger action number TR=3. Thus, the variable num is periodically changed as 1, 2, 0, 1, 2, 0 . . . , in accordance with the trigger action number, the maximum value of the change being (N−1). The paired images displayed in the image display area IMA in accordance with the variable num are changed to the pair 1, the pair 3, the pair 4, the pair 1 . . . in this order. Accordingly, the suitable pair is changed and displayed on the display screen every time the trigger action is carried out, so that any one of the pairs is surely designated for an arbitrary number of the trigger actions.

With reference to FIG. 13, the area RR1 shown by hatched lines is obtained by overlapping three valid mapping range VR1, VR3 and VR4, and when the designated point SP is designated within the area RR1, the pairs 1, 3 and 4 are alternately displayed at every trigger action as described above. When the physical point OP1 within the hatched area RR2 is intended to be drawn, by designating an arbitrary point within the area RR2, paired images, in which it is easy to designate the physical point, can be selected from the pairs 1, 2 and 3. Similarly, when the physical point OP2 is intended to be drawn, a point close to the physical point OP2 should be designated. However, since the area RR3, which contains the physical point OP2 and is shown by hatched lines, is composed of the valid mapping range VR1, only the pair 1 is displayed in the image display area IMA even if the trigger action is repeatedly carried out.

Thus, the images of the suitable pair corresponding to the designated point SP in the drawing area DRA can be displayed on the display screen, the pair which is optimum for designating the physical point can be easily selected, the manual operation of the operator is improved. Further, the selecting operation of the pair from the suitable pairs is the trigger action, which is simple and easy to operate.

A second embodiment of the present embodiment will be explained below. In the second embodiment, there are four images including a common target T. This embodiment is substantially the same as the first embodiment except that these four images are defined as a single group. Explanations of parts of the configuration the same as in the first embodiment are omitted. While not shown, the image display area IMA displays the four images of the group in parallel.

Figure 16:
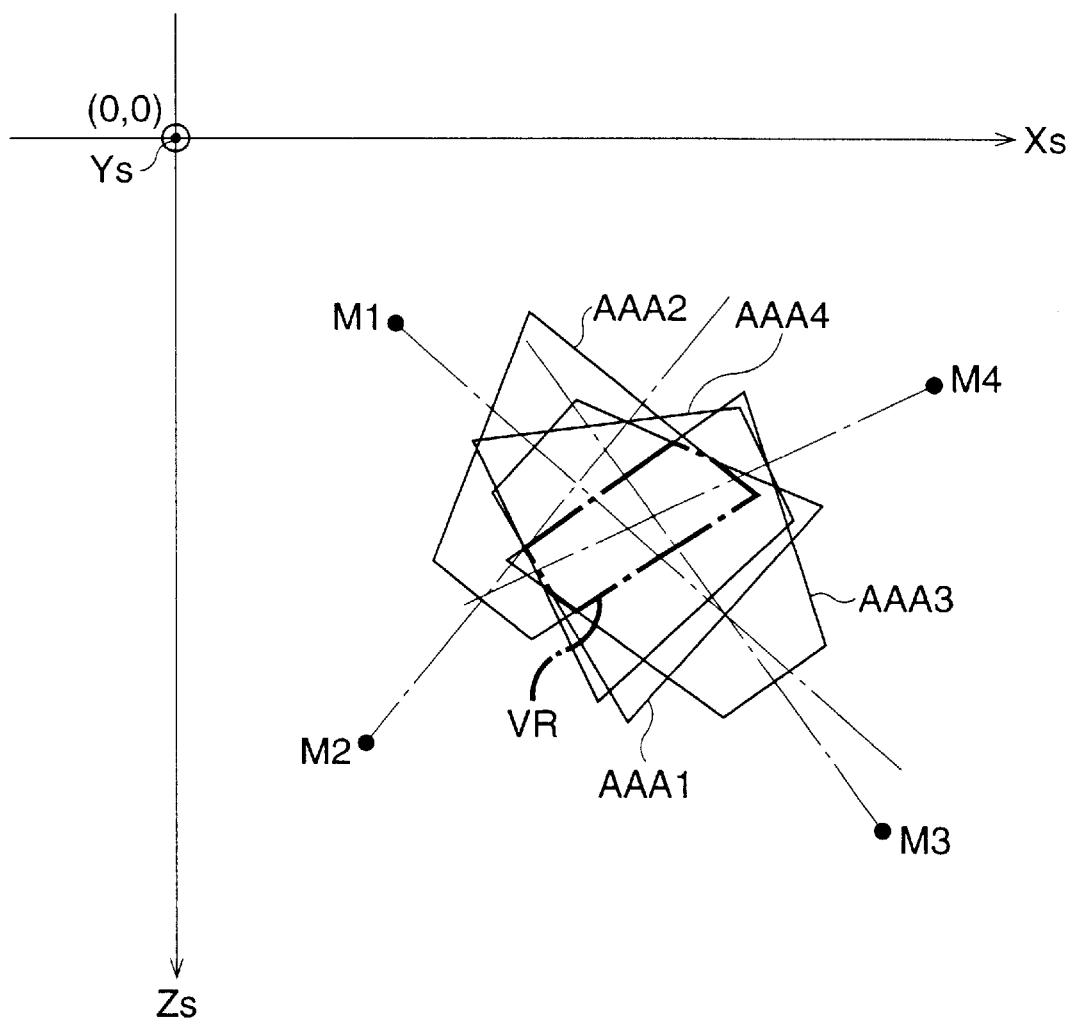
FIG. 16 is a schematic view of a photogrammetric image processing apparatus according to a second embodiment of the present invention for determining a valid mapping range from four ranges of guaranteed precision.

FIG. 16 is a view of the state of calculating a valid mapping range VR from the four ranges of guaranteed precision AAA1 to AAA4 and corresponds to FIG. 10 in the first embodiment. First, the ranges of guaranteed precision AAA1 and AAA2 at the camera positions M1 and M2 are determined and the ranges of guaranteed precision AAA3 and AAA4 at the camera positions M3 and M4 are determined. The technique for finding two ranges of guaranteed precision from two images is the same as in the first embodiment.

The overlapping area of all of these four ranges of guaranteed precision AAA1, AAA2, AAA3, and AAA4 is determined as the valid mapping range VR, and the boundary line of the valid mapping range is shown by a one-dot chain line.

According to the second embodiment, the valid mapping range VR having a higher precision than a conventional device is generated, so that a survey map having a high precision can be obtained.

The present disclosure relates to subject matter contained in Japanese Patent Application No. 11-178718 (filed on Jun. 24, 1999) which is expressly incorporated herein, by reference, in its entirety.

What is claimed is:

1. A photogrammetric image processing apparatus defining a plurality of images commonly including a target at a predetermined position as being in the same group, calculating the camera position of the photographing camera taking each image and the inclination of its optical axis for each image, designating a common physical point in each image, calculating three-dimensional coordinates of the physical point, and generating a survey map based on the three-dimensional coordinates, comprising:

a display processor that has a image display area for displaying all of said images belonging to the same group, and a drawing area for displaying said survey map;

an area computing processor that calculates a valid mapping range of the same group, which is shown in said drawing area, based on the camera position and the optical axis inclination; and a control processor that displays images of a predetermined group in said image display area, and displays said valid mapping range of said predetermined group in said drawing area.

2. An apparatus as set forth in claim 1, wherein said plurality of images of the same group are disposed in parallel in said image display area.

3. An apparatus as set forth in claim 1, wherein said image display area and said drawing area are displayed on a common display screen of said display processor, and said drawing area is positioned below said image display area in said common display screen.

4. An apparatus as set forth in claim 1, further comprising a first input processor that designates a group of images which are displayed in said image display area, said first input processor designating an arbitrary group whereby said valid mapping range of the designated group is displayed in said drawing area.

5. An apparatus as set forth in claim 1, further comprising a second input processor that designates a designated point in said drawing area, said second input processor designating an arbitrary designated point whereby images of said predetermined group corresponding to said valid mapping range containing said arbitrary designated point is displayed in said image display area.

6. An apparatus as set forth in claim 5, wherein, when a plurality of said valid mapping ranges, which contain said designated point, exist, one of said valid mapping ranges is selected by a trigger action of said second input processor, and images of the group corresponding to said valid mapping range selected are displayed in said image display area.

7. An apparatus as set forth in claim 1, wherein said area computing processor calculates a range of guaranteed precision corresponding to each image and determines an overlapping area of the ranges of guaranteed precision as said valid mapping range.

8. An apparatus as set forth in claim 7, wherein said range of guaranteed precision is found based on the camera position and a predetermined allowable error.

9. An apparatus as set forth in claim 8, wherein said camera is provided with an imaging device, an optical image is converted to an electronic image by said imaging device, and said range of guaranteed precision is found by considering the resolution power of said imaging device.

10. An apparatus as set forth in claim 9, wherein:
   a plan view of the ground from perpendicularly above is displayed on said drawing area as said survey map,
   said range of guaranteed precision is determined to be an area surrounded by two parallel lines perpendicular to the optical axis of said camera and separated from said camera by exactly a near limit of guaranteed precision and a far limit of guaranteed precision and two lines by which said range of a horizontal direction angle of view intersects the ground surface,
   said near limit of said guaranteed precision is the shortest distance between the line by which the range of the vertical direction angle of view of said camera intersects the ground surface and the vertical line from said camera to the ground surface, and
   said far limit of said guaranteed precision is the distance from said camera at which a length corresponding to the resolution power of said imaging device is equal to said allowable error.

11. An apparatus as set forth in claim 1, wherein each group comprises two images.

12. An apparatus as set forth in claim 1, wherein a plurality of said groups are provided, the coordinate system of each group is determined by a reference point provided on said target, the coordinate systems of said groups are converted to the coordinate system of any one group, so that said coordinate systems of all groups are unified.

13. A photogrammetric image processing method defining a plurality of images commonly including a target of a predetermined shape provided at a predetermined position and enabling output of an amount of displacement and rotational angle from an initial state as belonging to the same group, calculating the camera position of the photographing camera taking each image and the inclination of its optical axis for each image, displaying said image in an image display area of a display processor and designating a common physical point in each said image contained in said image display area, calculating three-dimensional coordinates of said physical point, generating a survey map based on the three-dimensional coordinates, and displaying said survey map in a drawing area of said display processor, comprising:
   a first step of calculating a range of guaranteed precision corresponding to each image based on the camera position and the optical axis inclination of each image included in the same group;
   a second step of calculating an overlapping area of the ranges of guaranteed precision of each said image of the same group to obtain a valid mapping range of the same group; and
   a third step of displaying images of a predetermined group in said image display area, and displaying said valid mapping range of said predetermined group in said drawing area.

14. A storage medium storing a photogrammetric image processing program defining a plurality of images commonly including a target of a predetermined shape provided at a predetermined position and enabling output of an amount of displacement and rotational angle from an initial state as belonging to the same group, calculating the camera position of the photographing camera taking each image and the inclination of its optical axis for each image, displaying said image in an image display area of a display processor and designating a common physical point in each said image contained in said image display area, calculating three-dimensional coordinates of said physical point, generating a survey map based on the three-dimensional coordinates, and displaying said survey map in a drawing area of said display processor,
   said photogrammetric image processing program including:
   a routine for calculating a range of guaranteed precision corresponding to each image based on the camera position and the optical axis inclination of each image included in the same group;
   a routine for calculating an overlapping area of the ranges of guaranteed precision of each said image of the same group to obtain a valid mapping range of the same group; and
   a routine for displaying images of a predetermined group in said image display area, and displaying said valid mapping range of said predetermined group in said drawing area.

* * * * *